US012614657B2

(12) United States Patent
Laneryd et al.

(10) Patent No.: US 12,614,657 B2
(45) Date of Patent: Apr. 28, 2026

(54) STATIC ELECTRIC INDUCTION SYSTEM AND METHOD

(71) Applicant: HITACHI ENERGY LTD, Zürich (CH)

(72) Inventors: Tor Laneryd, Enköping (SE); Andreas Gustafsson, Ludvika (SE)

(73) Assignee: HITACHI ENERGY LTD, Zürich (CH)

( * ) Notice: Subject to any disclaimer, the term of this patent is extended or adjusted under 35 U.S.C. 154(b) by 743 days.

(21) Appl. No.: 17/637,736

(22) PCT Filed: Sep. 9, 2020

(86) PCT No.: PCT/EP2020/075215

§ 371 (c)(1),
(2) Date: Feb. 23, 2022

(87) PCT Pub. No.: WO2021/083574

PCT Pub. Date: May 6, 2021

(65) Prior Publication Data

US 2022/0285070 A1 Sep. 8, 2022

(30) Foreign Application Priority Data

Oct. 29, 2019 (EP) .................................... 19205813

(51) Int. Cl.
*H01F 27/10* (2006.01)

(52) U.S. Cl.
CPC .................................... *H01F 27/10* (2013.01)

(58) Field of Classification Search
CPC ....................................................... H01F 27/10
(Continued)

(56) References Cited

U.S. PATENT DOCUMENTS 1,835,470 A * 12/1931 Clarke .................... H01F 27/12 123/41.1
2,388,565 A * 11/1945 Paluev .................. H01F 27/322 165/104.31
(Continued)

FOREIGN PATENT DOCUMENTS

CA 2401121 A1 * 8/2001 ........... F28D 1/0233
CN 105723478 A 6/2016
(Continued)

OTHER PUBLICATIONS

Korean Office Action and English Summary, Korean Patent Application No. 10-2022-7006577, mailed Nov. 23, 2023, 12 pages.
(Continued)

*Primary Examiner* — Shawki S Ismail
*Assistant Examiner* — Joselito S. Baisa
(74) *Attorney, Agent, or Firm* — Sage Patent Group

(57) ABSTRACT

A sialic electric induction system is provided. The static electric induction system includes a heat generating electric component; a dielectric cooling fluid; a cooling passage structure along the electric component; and a pump arrangement arranged to alternatingly be controlled in a first mode and in a second mode. In the first mode, the pump arrangement pumps the dielectric cooling fluid to be driven through the cooling passage structure in a forward direction to cool the electric component, and in the second mode, the pump arrangement pumps the dielectric cooling fluid to be driven through the cooling passage structure in a reverse direction, opposite to the forward direction, to cool the electric component. A method of controlling a static electric induction system is also provided.

19 Claims, 2 Drawing Sheets

(58) Field of Classification Search
USPC ........................................................... 336/57
See application file for complete search history.

(56) References Cited

U.S. PATENT DOCUMENTS

| | | | | | |
|---|---|---|---|---|---|
| 2,479,373 | A * | 8/1949 | Knotts | H01F 27/14 165/104.31 |
| 2,990,443 | A * | 6/1961 | Camilli | H01F 27/18 174/15.1 |
| 3,416,110 | A | 12/1968 | Morris et al. | |
| 4,000,482 | A * | 12/1976 | Staub | H01F 27/322 336/60 |
| 4,245,206 | A * | 1/1981 | Daikoku | H01F 27/08 336/185 |
| 5,508,672 | A | 4/1996 | Sokai | |
| 8,081,054 | B2 * | 12/2011 | Guentert, III | H01F 27/12 336/58 |
| 10,438,734 | B2 * | 10/2019 | Bel Fdhila | H01F 27/12 |
| 2002/0024262 | A1 * | 2/2002 | Hayase | H01F 27/10 310/59 |
| 2011/0140820 | A1 * | 6/2011 | Guentert, III | H01F 27/12 336/58 |
| 2014/0327506 | A1 | 11/2014 | Gustafsson et al. | |
| 2018/0240587 | A1 * | 8/2018 | Bel Fdhila | H01F 27/12 |

FOREIGN PATENT DOCUMENTS

| | | | | |
|---|---|---|---|---|
| CN | 112970078 | A * | 6/2021 | H01F 27/12 |
| EP | 2851912 | A1 * | 3/2015 | H01F 27/10 |
| EP | 3171372 | A1 | 5/2017 | |
| EP | 3435049 | A1 | 1/2019 | |
| EP | 4413600 | B1 * | 1/2025 | H01F 27/322 |
| JP | 6094707 | A | 5/1985 | |
| JP | 61179512 | A | 8/1986 | |
| KR | 10-1795770 | B1 | 11/2017 | |
| WO | WO-2011061207 | A1 * | 5/2011 | H01F 27/085 |
| WO | WO-2019181152 | A1 * | 9/2019 | H01F 27/12 |

OTHER PUBLICATIONS

Chinese Office Action, Chinese Patent No. 2020800610631, mailed May 10, 2023, 9 pages.

International Search Report and Written Opinion of the International Searching Authority, PCT/EP2020/075215, mailed Nov. 27, 2020, 17 pages.

English Summary of Chinese Office Action as identified in the IDS filed on Jun. 27, 2023, Chinese Application No. 20200800610631, mailed Jun. 26, 2023, 5 pages.

* cited by examiner

STATIC ELECTRIC INDUCTION SYSTEM AND METHOD

CROSS-REFERENCE TO RELATED APPLICATIONS

This application is a 35 U.S.C. § 371 national stage application of PCT International Application No. PCT/EP2020/075215, filed on Sep. 9, 2020, which in turn claims foreign priority to European Patent Application No. 19205813.9, filed on Oct. 29, 2019, the disclosures and content of which are incorporated by reference herein in their entireties.

TECHNICAL FIELD

The present disclosure generally relates to static electric induction systems comprising a heat generating electric component and a cooling fluid. In particular, a static electric induction system comprising a pump arrangement arranged to pump cooling fluid through a cooling passage structure in a forward direction and in a reverse direction, and a method of controlling a static electric induction system comprising pumping cooling fluid through a cooling passage structure in a forward direction and in a reverse direction, are provided.

BACKGROUND

High voltage static electric induction systems, such as power transformers, comprise windings wound around a magnetic core. Each winding may comprise a plurality of cable turns arranged in a winding disc. A plurality of winding discs may be arranged in a winding section. The windings are typically electrically insulated by means of an insulation material. The windings are often subjected to currents that result in heat development that can damage the windings or the insulation material if cooling of the windings is not to be provided.

There are a number of ways in which a high voltage static electric induction system can be cooled. Cooling may for example be performed by means of natural convection of a cooling fluid, such as oil, circulating through an enclosure of the high voltage static electric induction system. A dedicated cooling system comprising a pump may be used to maintain the winding temperature within an acceptable range.

US 2018240587 A1 discloses a static electric induction system. The system includes a heat generating component, cooling fluid, a cooling duct along the heat generating component and a pumping system configured for driving the cooling fluid through the cooling duct. The pumping system is configured for applying a varying flow rate over time of the cooling fluid in the cooling duct along a predetermined flow rate curve which is a function of time.

EP 3171372 A1 discloses an in-vehicle transformation device comprising a transformer, insulation oil and a pump. The pump is configured to selectively cause the insulation oil to flow in one of (i) one direction of directions orthogonal to a stacking direction of eight plate-like windings and (ii) the other direction opposite to this one direction.

JP S61179512 A discloses a gas-insulated transformer comprising a low voltage winding, a high voltage winding, a refrigerant, cooling ducts, a pump and a motor driving the pump. The rotating direction of the motor can be reversed by changing over a switch provided on the motor for driving the pump, whereby the circulating direction of the refrigerant also can be reversed.

U.S. Pat. No. 3,416,110 A discloses a transformer 10 comprising a high voltage coil, a low voltage coil, a fluid dielectric, cooling ducts and pumping means. The pumping means pumps cooled fluid dielectric from heat exchanger means into a first upper compartment, through cooling ducts in an upper half of a winding assembly to a second upper compartment, and then through duct means into a second lower compartment, through cooling ducts in a lower half of winding assembly to a first lower compartment, and then through heat exchanger means.

JP S6094707 A discloses a static induction electric device comprising a winding, cooling fluid, ducts and a fluid driving device. The static induction electric device can be provided with two different cooling designs, always with a unidirectional pump.

U.S. Pat. No. 5,508,672 A discloses a stationary reduction apparatus arranged so that coil groups comprising plate type (or disc type) coils, which are stacked up in multiple layers with spacers inserted therebetween to traverse through a core whereby a refrigerant may pass through inter-layer clearances, are provided and divided into a plurality of coil sub-groups and every other coil sub-group of the divided coil sub-groups is surrounded by a refrigerant guide which is provided with an opening on its internal periphery and refrigerant flow ports on its external periphery, and the refrigerant is introduced into the refrigerant guide to flow in a horizontal direction through respective inter-layer clearances of the stacked-up coil groups.

SUMMARY

Ageing of insulation material in a static electric induction system is largely dependent on the position and temperature of one or more hotspots in the windings. In conventional oil directed (OD) cooling designs, oil is pumped through an external cooler and through a pressure chamber below the windings that distributes the oil into the windings. In such designs, the winding hotspot will generally occur at the bottom of each winding section due to the Venturi effect. Hotspots may be formed, e.g. due to static swirls or locally stagnant fluid, also at higher flow rates of the cooling fluid. Thus, to merely increase the flow rate may not eliminate hotspots or at all (or only to a limited degree) improve the cooling of the static electric induction system.

One object of the present disclosure is to provide a static electric induction system having an increased lifetime.

A further object of the present disclosure is to provide a static electric induction system having a compact design.

A still further object of the present disclosure is to provide a static electric induction system with an improved cooling.

A still further object of the present disclosure is to provide a static electric induction system having a simple design.

A still further object of the present disclosure is to provide a static electric induction system having a reliable design.

A still further object of the present disclosure is to provide a static electric induction system solving several or all of the foregoing objects in combination.

A still further object of the present disclosure is to provide a method of controlling a static electric induction system, which method solves one, several or all of the foregoing objects.

According to one aspect, there is provided a static electric induction system comprising a heat generating electric component; a dielectric cooling fluid; a cooling passage structure along the electric component; and a pump arrangement arranged to alternatingly be controlled in a first mode and in a second mode, wherein in the first mode, the pump arrangement pumps the cooling fluid to be driven through the cooling passage structure in a forward direction to cool the electric component, and wherein in the second mode, the pump arrangement pumps the cooling fluid to be driven through the cooling passage structure in a reverse direction, opposite to the forward direction, to cool the electric component.

When the pump arrangement is switched from the first mode to the second mode, the flow direction of the cooling fluid through the cooling passage structure is reversed, i.e. switched from the forward direction to the reverse direction. A major benefit is achieved when alternating the flow of cooling fluid in the forward direction and in the reverse direction in that the temperature distribution (considering only hydrodynamic effects) will basically be the opposite.

For example, in case the static electric induction system comprises a plurality of winding sections having winding discs, cold cooling fluid will enter each winding section from an opposite side in the forward direction and in the reverse direction. Thereby, an increased temperature due to the Venturi effect will apply to the opposite disc in each winding section when the cooling fluid flows in the forward direction in comparison with when the cooling fluid flows in the reverse direction.

By alternating the flow of cooling fluid between the forward direction and the reverse direction, a position of one or more hotspots can be changed. Thus, at least one hotspot location in the cooling circuit is different when the cooling fluid passes through the cooling passage structure in the forward direction in comparison with when the cooling fluid passes through the cooling passage structure in the reverse direction.

The ageing of components of the static electric induction system, such as insulation material, can thereby be reduced. Alternatively, or in addition, the static electric induction system can be made more compact. Thus, the static electric induction system according to the present disclosure improves the cooling by alternating a flow through a cooling passage structure and by thereby moving one or more hotspots.

The pump arrangement according to the present disclosure may thus be controlled in a first mode where the pump arrangement pumps the cooling fluid to be driven through the cooling passage structure in the forward direction and at least one hotspot occurs at a first location, and in a second mode where the pump arrangement pumps the cooling fluid to be driven through the cooling passage structure in the reverse direction and at least one hotspot occurs at a second location, different from the first location.

The pump arrangement according to the present disclosure may be controlled in either of two distinct cooling modes, i.e. the first mode and the second mode. In each cooling mode, there is always a clearly defined flow direction of the cooling fluid through the cooling passage structure. In the first mode, the cooling fluid passes through the cooling passage structure in the forward direction, and in the second mode, the cooling fluid passes through the cooling passage structure in the reverse direction. The cooling passage structure and the pump arrangement may form part of a cooling circuit.

The cooling passage structure may be generally vertical, or vertical. Thus, ends of the cooling passage structure may be vertically separated, e.g. such that a winding is arranged vertically between the ends of the cooling passage structure. In the first mode, the pump arrangement may generally cooperate with gravity. In the second mode, the pump arrangement may generally counteract gravity.

The cooling passage structure is arranged to supply the cooling fluid to the electric component to cool the same. The cooling passage structure may comprise one or more parallel sections, such as parallel horizontal sections.

The static electric induction system may further comprise insulation material for electrically insulating the electric component. Also the insulation material may be cooled by passing cooling fluid through the cooling passage structure.

Throughout the present disclosure, the static electric induction system may be a power transformer or a reactor. The static electric induction system may be a high voltage static electric induction system. As used herein, a high voltage may be at least 30 kV, such as at least 100 kV.

The static electric induction system may further comprise a winding. In this case, the electric component may be a cable turn of the winding, and the cooling passage structure may be arranged along the winding from a bottom part of winding to a top part of the winding. The cooling fluid can thereby flow through the entire winding from the bottom part to the top part, or vice versa. The top part may be arranged geodetically above the bottom part.

Each cable turn of the winding may be arranged between the bottom part and the top part. When the pump arrangement is controlled in the first mode, the cooling fluid flows from the bottom part, through the cooling passage structure, and to the top part. When the pump arrangement is controlled in the second mode, the cooling fluid flows from the top part, through the cooling passage structure, to the bottom part. By controlling the cooling fluid to flow generally upwards through the winding or generally downwards through the winding, the location of one or more hotspots can be moved. As a consequence, ageing of insulation material can be controlled and reduced.

The winding may comprise a bottom opening in the bottom part and a top opening in the top part. The cooling passage structure may extend between the bottom opening and the top opening. The top opening may be arranged geodetically above the bottom opening.

When the pump arrangement is controlled in the first mode, the cooling fluid may enter the cooling passage structure through the bottom opening, pass through the cooling passage structure in the forward direction, and be discharged from the cooling passage structure through the top opening. Conversely, when the pump arrangement is controlled in the second mode, the cooling fluid may enter the cooling passage structure through the top opening, pass through the cooling passage structure in the reverse direction, and be discharged from the cooling passage structure through the bottom opening.

The top opening may be in direct fluid communication with a suction chamber. The bottom opening may be in direct fluid communication with a bottom section of an enclosure.

Each winding may comprise a plurality of discs, where each disc comprises a plurality of cable turns. Alternatively, each winding may comprise a helical winding structure or a layer winding structure. The static electric induction system may comprise one or more windings.

The cooling passage structure may extend along at least 90%, such as along at least 98%, such as along 100%, of a height of the winding.

The cooling passage structure may comprise two vertical sections and at least one horizontal section interconnecting the vertical sections. In this case, the cooling fluid may be driven upwards in each vertical section when the pump arrangement is controlled in the first mode, and the cooling fluid may be driven downwards in each vertical section when the pump arrangement is controlled in the second mode.

The static electric induction system may further comprise a suction chamber arranged above the electric component. When comprising such suction chamber, the static electric induction system has a top-mounted oil directed (OD) design. One example of a suction chamber is described in patent application US 2014327506 A1. The top-mounted suction chamber is easier to manufacture and enables a reduced detrimental effect of unwanted leakages of cooling fluid. The suction chamber may form part of the cooling circuit.

The suction chamber may be arranged to suck the cooling fluid from the cooling passage structure into the suction chamber when the pump arrangement is controlled in the first mode, and arranged to discharge the cooling fluid from the suction chamber into the cooling passage structure when the pump arrangement is controlled in the second mode.

The suction chamber may additionally be arranged to suck the cooling fluid from a side section containing the cooling fluid horizontally outside the electric component when the pump arrangement is controlled in the first mode. Conversely, the suction chamber may be arranged to additionally discharge the cooling fluid to the side section when the pump arrangement is controlled in the second mode.

The static electric induction system may further comprise a substantially closed, or closed, upper passage between the suction chamber and the pump arrangement. The upper passage may form part of the cooling circuit.

The static electric induction system may further comprise an enclosure, and the electric component may be arranged inside the enclosure. In this case, the pump arrangement may be arranged outside the enclosure.

The static electric induction system may further comprise a cooler arranged to cool the cooling fluid. The cooler may be arranged outside of the enclosure.

The static electric induction system may further comprise a closed lower passage between the pump arrangement and the enclosure. The lower passage may form part of the cooling circuit.

The enclosure may comprise a bottom section below the electric component. In this case, the bottom section and the cooling passage structure may be arranged such that the cooling fluid is driven from the bottom section into the cooling passage structure when the pump arrangement is controlled in the first mode, and such that the cooling fluid is driven from the cooling passage structure into the bottom section when the pump arrangement is controlled in the second mode. The bottom section may form part of the cooling circuit.

The enclosure may comprise a side section containing the cooling fluid horizontally outside the electric component. In this case, the side section may be in fluid communication with the bottom section, e.g. by means of natural convection.

The pump arrangement may comprise a reversible pump. As a possible alternative, the pump arrangement may comprise a first pump and a second pump. In the first mode of the pump arrangement, the first pump is operative and the second pump is inoperative. In the second mode of the pump arrangement, the second pump is operative and the first pump is inoperative. In this case, the first pump and the second pump may be non-reversible.

The cooling fluid may be a dielectric liquid with Prandtl number above 20, such as above 50, such as above 100, in a temperature range of operation of the electric component.

The cooling fluid may for example be mineral oil, natural ester, synthetic ester or isoparaffinic liquid.

The static electric induction system may further comprise a control system. The control system may comprise a data processing device and a memory having a computer program stored thereon, the computer program comprising program code which, when executed by the data processing device, causes the data processing device to perform the steps of controlling the pump arrangement in the first mode to pump the cooling fluid such that the cooling fluid is driven through the cooling passage structure in a forward direction to cool the electric component, and controlling the pump arrangement in a second mode to pump the cooling fluid such that the cooling fluid is driven through the cooling passage structure in a reverse direction, opposite to the forward direction, to cool the electric component. The computer program may further comprise program code which, when executed by the data processing device, causes the data processing device to perform any step, or command performance of any step, according to the present disclosure.

The static electric induction system may further comprise a monitoring system. The monitoring system may for example collect or calculate various temperature data over time and calculate hotspot temperatures and/or hotspot locations along the cooling passage. The monitoring system may comprise one or more temperature sensors for collecting temperature data. Alternatively, or in addition, the monitoring system may comprise a digital twin of the static electric induction system for calculating temperature data.

According to a further aspect, there is provided a method of controlling a static electric induction system comprising a heat generating electric component, a dielectric cooling fluid, a cooling passage structure along the electric component, and a pump arrangement arranged to pump the cooling fluid, wherein the method comprises controlling the pump arrangement in a first mode to pump the cooling fluid such that the cooling fluid passes through the cooling passage structure in a forward direction to cool the electric component; and controlling the pump arrangement in a second mode to pump the cooling fluid such that the cooling fluid passes through the cooling passage structure in a reverse direction, opposite to the forward direction, to cool the electric component. The method may be carried out with a static electric induction system of any type according to the first aspect.

The method may further comprise controlling the pump arrangement in the first mode during at least five minutes, such as at least ten minutes, prior to controlling the pump arrangement in the second mode. The static electric induction system may be configured such that after operation of the pump arrangement in the first mode for at least five minutes, the entirety of cooling fluid inside the winding has been replaced, and after operation of the pump arrangement in the second mode for at least five minutes, the entirety of cooling fluid inside the winding has been replaced.

Alternatively, the method may comprise controlling the pump arrangement during longer time periods, such as six months, following seasonal variations. For example, controlling the pump arrangement in the first mode during the summer and in the second mode during the winter.

The static electric induction system may further comprise an insulation material arranged to electrically insulate the electric component, and wherein the method further comprises estimating a condition or an expected remaining lifetime of the insulation material; and switching the control of the pump arrangement between the first mode and the second mode based on the estimation.

The estimation may comprise monitoring various parameters of the static electric induction system, for example a temperature at one or several locations. The monitoring can be carried out by means of a monitoring system or a digital twin. Alternatively, or in addition, the estimation may comprise load forecasting of the static electric induction system.

The method may further comprise using artificial intelligence to estimate the condition or the expected remaining lifetime of the insulation material. Alternatively, or in addition, artificial intelligence can be used to control the switching of the control of the pump arrangement between the first mode and the second mode to optimize the ageing distribution, without need for human supervision.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
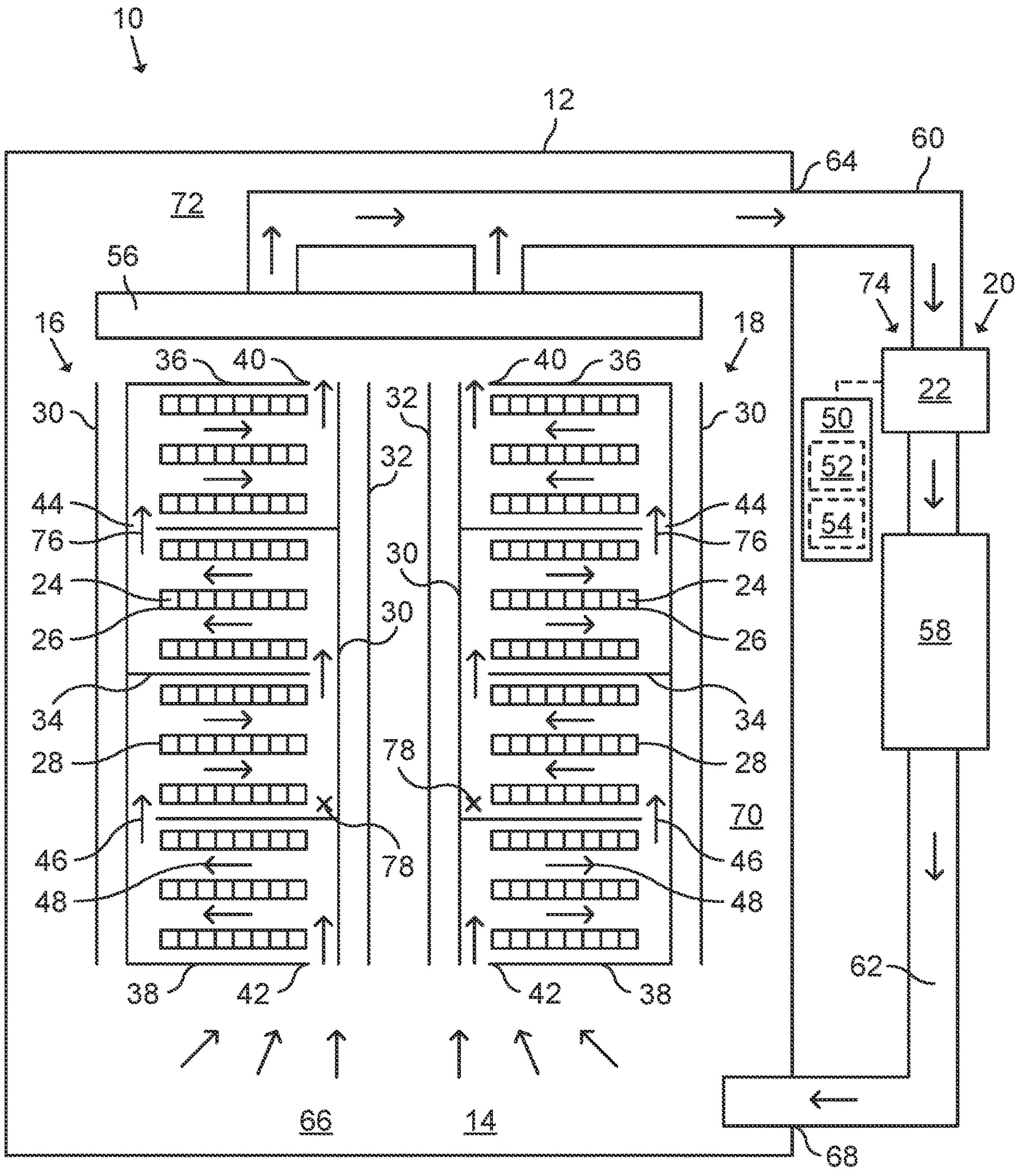
FIG. 1 schematically represents a static electric induction system and a pump arrangement controlled in a first mode.

In the following, a static electric induction system comprising a pump arrangement arranged to pump cooling fluid through a cooling passage structure in a forward direction and in a reverse direction, and a method of controlling a static electric induction system comprising pumping cooling fluid through a cooling passage structure in a forward direction and in a reverse direction, will be described. The same or similar reference numerals will be used to denote the same or similar structural features.

FIG. 1 schematically represents a static electric induction system 10. The static electric induction system 10 of this example is a high voltage power transformer comprising an enclosure 12 filled with a dielectric cooling fluid 14. The static electric induction system 10 further comprises a low voltage winding 16, a high voltage winding 18 and a pump arrangement 20. The windings 16, 18 are arranged inside the enclosure 12 and the pump arrangement 20 is arranged outside the enclosure 12. The pump arrangement 20 of this example comprises a reversible pump 22.

A high voltage power transformer is used as an example, but the static electric induction system 10 of the present disclosure may alternatively be e.g. a reactor. The power transformer in FIG. 1 is a single-phase transformer, but the discussion is in applicable parts relevant for any type of transformer or other static electric induction system 10, e.g. a three-phase transformer such as with a three or five legged magnetic core. It should be noted that FIG. 1 is only schematic and provided to illustrate some basic parts of the static electric induction system 10.

The cooling fluid 14 is a dielectric liquid, such as a mineral oil, a natural ester, a synthetic ester or an isoparaffinic liquid. The cooling fluid 14 has a Prandtl number above 100 in a temperature range of operation of the static electric induction system 10.

Each winding 16, 18 comprises a plurality of cable turns 24 wrapped in an electrically insulated insulation material 26, such as paper. The cable turns 24 of each winding 16, 18 are wound around a magnetic core (not shown). Each cable turn 24 is a heat generating electric component during operation of the static electric induction system 10.

The cable turns 24 are arranged in discs 28. In FIG. 1, each winding 16, 18 comprises 12 discs 28, but the number of discs 28 and the number of cable turns 24 in each disc 28 may vary. Each winding 16, 18 further comprises an insulation cylinder 30. One or more horizontal spacers (not shown) may be arranged between the discs 28. One or more vertical spacers (not shown) may be arranged between the discs 28 and the insulation cylinder 30. Two pressboard barriers 32 are arranged between the windings 16, 18.

Each winding 16, 18 further comprises three washers 34. The washers 34 are alternatingly protruding horizontally from the insulation cylinder 30. The washers 34 define a plurality of winding sections. Each winding 16, 18 of this example thus comprises four winding sections and each winding section comprises three discs 28.

Each winding 16, 18 comprises a top part 36 and a bottom part 38. A top opening 40 is arranged in the top part 36 and a bottom opening 42 is arranged in the bottom part 38. The top opening 40 and the bottom opening 42 are at different heights and on vertically opposite sides of the respective winding 16, 18.

The static electric induction system 10 further comprises a cooling passage structure 44 through each winding 16, 18. Each cooling passage structure 44 extends between the top opening 40 and the bottom opening 42 through the entire respective winding 16, 18. Each cooling passage structure 44 thus extends over the entire height of the respective winding 16, 18.

In this example, each cooling passage structure 44 comprises two vertical sections 46 and a plurality of horizontal sections 48 between the vertical sections 46. By means of the cooling passage structures 44, the cooling fluid 14 can be led to and past the cable turns 24 to transport heat away from the cable turns 24 and the insulation material 26 to thereby cool the same.

The static electric induction system 10 further comprises a control system 50. The control system 50 comprises a data processing device 52 and a memory 54 having a computer program stored thereon. The computer program comprises program code which, when executed by the data processing device 52, causes the data processing device 52 to control operation of the pump arrangement 20.

The static electric induction system 10 further comprises a suction chamber 56. The suction chamber 56 is arranged inside the enclosure 12 above both windings 16, 18.

The static electric induction system 10 further comprises a cooler 58, for example a heat exchanger. The cooler 58 is arranged serially with the pump 22, in this example below the pump 22. Also the cooler 58 is arranged outside of the enclosure 12.

The static electric induction system 10 further comprises an upper passage 60 and a lower passage 62. The upper passage 60 of this example is a closed pipe structure arranged between the suction chamber 56 and the pump 22. To this end, the upper passage 60 extends through an upper opening 64 in the enclosure 12. Adjacent to the suction chamber 56, the upper passage 60 branches into two pipe sections. The lower passage 62 of this example is a pipe arranged between the cooler 58 and a bottom section 66 of the enclosure 12. The lower passage 62 extends through a lower opening 68 in the enclosure 12.

The enclosure 12 further comprises a side section 70 laterally outside the windings 16, 18 and a top section 72 above the suction chamber 56. The side section 70 and the top section 72 also contain cooling fluid 14 and are in fluid communication with the bottom section 66.

In the example in FIG. 1, the pump 22, the cooler 58, the lower passage 62, the bottom section 66, the cooling passage structures 44 through the windings 16, 18, the suction chamber 56 and the upper passage 60 form a cooling circuit.

In FIG. 1, the pump arrangement 20 is controlled in a first mode 74. This causes the cooling fluid 14 to be forced through the cooling passage structure 44 in a forward direction 76 to cool the cable turns 24. As shown in FIG. 1, cool cooling fluid 14, that has accumulated in the bottom part 38, is sucked directly into the cooling passage structure 44 through the bottom opening 42. The cooling fluid 14 flows from the bottom part 38 to the top part 36 of each winding 16, 18 when the pump 22 is controlled in the first mode 74.

In the first mode 74, the bottom opening 42 constitutes an inlet and the top opening 40 constitutes an outlet. Furthermore, in the first mode 74, the cooling fluid 14 flows upwards in each vertical section 46. Thus, the cooling fluid 14 flows generally upwards through the windings 16, 18.

In this example, the pump 22 is controlled to pump the cooling fluid 14 downwards from the pump 22 through the cooler 58. Thus, the pump 22 cooperates with gravity in the first mode 74. This causes the suction chamber 56 to suck cooling fluid 14 through the cooling passage structure 44 to cool the cable turns 24. The suction chamber 56 may also suck some bypassed cooling fluid 14 directly from the side section 70. Due to the Venturi effect, one or more hotspots 78 may in this case be formed in a lower part of one or several winding sections.

The ageing of the insulation material 26 largely depends on the time integrated value of the local temperature adjacent to the insulation material 26. If the hotspot 78 is maintained in the position shown in FIG. 1, the insulation material 26 adjacent to the hotspot 78 will eventually be subjected to higher temperatures and consequently a faster ageing. The lifetime of the static electric induction system 10 will consequently be shortened.

Figure 2:
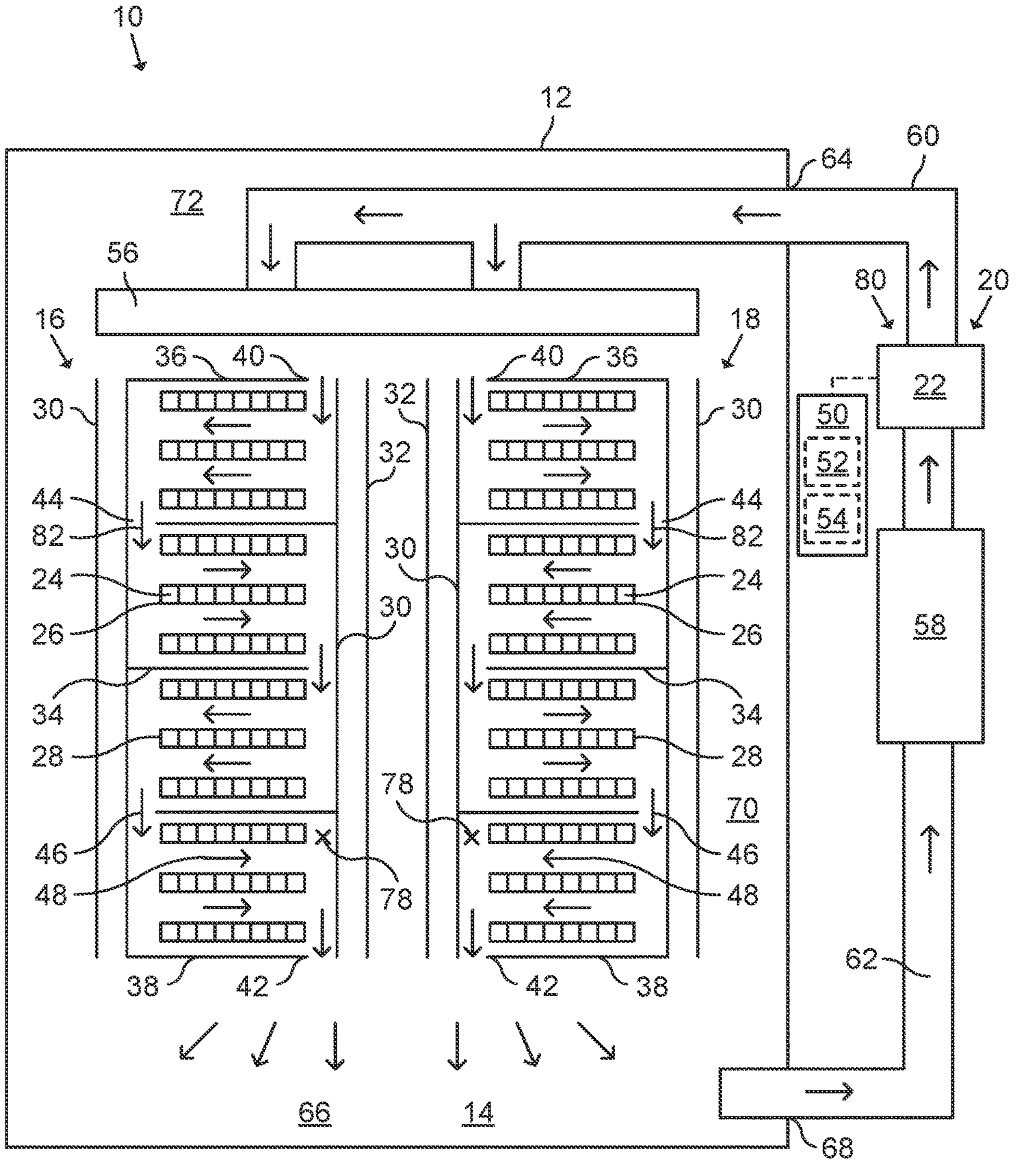
FIG. 2 schematically represents the static electric induction system and the pump arrangement controlled in a second mode.

FIG. 2 schematically represents the static electric induction system 10. In FIG. 2, the pump 22 is controlled in a second mode 80. Under the control of the control system 50, the pump 22 can be alternatingly controlled in the first mode 74 and in the second mode 80, for example during time intervals of approximately ten minutes.

When the pump 22 is controlled in the second mode 80, the cooling fluid 14 is forced through the cooling passage structure 44 in a reverse direction 82, opposite to the forward direction 76, to cool the cable turns 24. Thus, the second mode 80 is distinct from the first mode 74. As shown in FIG. 2, the cooling fluid 14 flows from the top part 36 to the bottom part 38 of each winding 16, 18 when the pump 22 is controlled in the second mode 80.

In the second mode 80, the top opening 40 constitutes an inlet and the bottom opening 42 constitutes an outlet. Furthermore, in the second mode 80, the cooling fluid 14 flows downwards in each vertical section 46. Thus, the cooling fluid 14 flows generally downwards through the windings 16, 18.

In this example, the pump 22 is controlled to pump the cooling fluid 14 upwards from the cooler 58 and into the upper passage 60. Thus, the pump 22 counteracts gravity in the second mode 80. This causes the suction chamber 56 to discharge cooling fluid 14 into the cooling passage structure 44 to cool the cable turns 24. After passing through the entire respective winding 16, 18, the cooling fluid 14 is discharged from the cooling passage structure 44 into the bottom section 66.

Due to the Venturi effect, one or more hotspots 78 may in this case be formed in an upper part of one or more winding sections, i.e. at different positions than in FIG. 1 when the pump 22 operates in the first mode 74. Thus, positions the hotspots 78 are different depending on whether the cooling fluid 14 passes through the cooling passage structure 44 in the forward direction 76 or in the reverse direction 82. As can be gathered from FIGS. 1 and 2, the temperature distributions in the windings 16, 18 due to hydrodynamic effects are substantially the opposite in the forward direction 76 and in the reverse direction 82.

By alternating the direction of cooling fluid 14 through the cooling passage structure 44 from time to time by changing the operating state of the pump arrangement 20 between the first mode 74 and the second mode 80, the position of one or more hotspots 78 can be changed. Averaged over time, the ageing of the insulation material 26 can thereby be reduced. Alternatively, the enclosure 12 can be made more compact.

In order to determine when to switch between the first mode 74 and the second mode 80, a condition or an expected remaining lifetime of the insulation material 26 can be taken into account. The estimation may for example be based on data from a monitoring system (not shown), such as temperature data, or from a digital twin (not shown) of the static electric induction system 10. Artificial intelligence, e.g. implemented in the control system 50, can be used to further optimize the alternations between the first mode 74 and the second mode 80 without the need for human supervision.

While the present disclosure has been described with reference to exemplary embodiments, it will be appreciated that the present subject matter is not limited to what has been described above. For example, it will be appreciated that the dimensions of the parts may be varied as needed. Accordingly, it is intended that the present subject matter may be limited only by the scope of the claims appended hereto.

The invention claimed is:

1. A static electric induction system comprising:

a heat generating electric component;

a dielectric cooling fluid;

a cooling passage structure along the electric component; and a pump arrangement arranged to alternatingly be controlled in a first mode and in a second mode, wherein in the first mode, the pump arrangement pumps the dielectric cooling fluid to be driven through the cooling passage structure in a forward direction to cool the electric component, and wherein in the second mode, the pump arrangement pumps the dielectric cooling fluid to be driven through the cooling passage structure in a reverse direction, opposite to the forward direction, to cool the electric component;

wherein the dielectric cooling fluid is a dielectric liquid with Prandtl number above 20 in a temperature range of operation of the electric component and the static electric induction system further comprising a winding, wherein the electric component is a cable turn of the winding, wherein the cooling passage structure is arranged along the winding from a bottom part of winding to a top part of the winding, and wherein the cooling fluid alternatingly flows generally upwards and generally downwards through the winding via the cooling passage structure in response to alternating between the first mode and the second mode.

2. The static electric induction system according to claim 1, wherein the cooling passage structure extends along at least 90% of a height of the winding.

3. The static electric induction system according to claim 1, wherein the cooling passage structure comprises two vertical sections and at least one horizontal section interconnecting the vertical sections, wherein the dielectric cooling fluid is driven upwards in each vertical section when the pump arrangement is controlled in the first mode, and wherein the dielectric cooling fluid is driven downwards in each vertical section when the pump arrangement is controlled in the second mode.

4. The static electric induction system according to claim 1, further comprising a suction chamber arranged above the electric component.

5. The static electric induction system according to claim 4, wherein the suction chamber is arranged to suck the dielectric cooling fluid from the cooling passage structure into the suction chamber when the pump arrangement is controlled in the first mode, and arranged to discharge the dielectric cooling fluid from the suction chamber into the cooling passage structure when the pump arrangement is controlled in the second mode.

6. The static electric induction system according to claim 5, further comprising a substantially closed upper passage between the suction chamber and the pump arrangement.

7. The static electric induction system according to claim 1, further comprising an enclosure, and wherein the electric component is arranged inside the enclosure.

8. The static electric induction system according to claim 7, further comprising a closed lower passage between the pump arrangement and the enclosure.

9. The static electric induction system according to claim 7, wherein the enclosure comprises a bottom section below the electric component, and wherein the bottom section and the cooling passage structure are arranged such that the dielectric cooling fluid is driven from the bottom section into the cooling passage structure when the pump arrangement is controlled in the first mode, and such that the dielectric cooling fluid is driven from the cooling passage structure into the bottom section when the pump arrangement is controlled in the second mode.

10. The static electric induction system according to claim 1, wherein the pump arrangement comprises a reversible pump.

11. The static electric induction system according to claim 1, wherein the dielectric cooling fluid is a dielectric liquid with Prandtl number above 50 in a temperature range of operation of the electric component.

12. The static electric induction system according to claim 1, wherein the dielectric cooling fluid is a dielectric liquid with Prandtl number above 100 in a temperature range of operation of the electric component.

13. A method of controlling a static electric induction system comprising a heat generating electric component, a dielectric cooling fluid, a cooling passage structure along the electric component, a winding, wherein the electric component is a cable turn of the winding, and wherein the cooling passage structure is arranged along the winding from a bottom part of winding to a top part of the winding, and a pump arrangement arranged to pump the dielectric cooling fluid, wherein the dielectric cooling fluid is a dielectric liquid with Prandtl number above 20 in a temperature range of operation of the electric component, and wherein the method comprises:

controlling the pump arrangement in a first mode to pump the cooling fluid such that the dielectric cooling fluid is driven through the cooling passage structure in a forward direction to cool the electric component; and controlling the pump arrangement in a second mode to pump the cooling fluid such that the dielectric cooling fluid is driven through the cooling passage structure in a reverse direction, opposite to the forward direction, to cool the electric component, wherein the cooling fluid alternatingly flows generally upward and generally downwards through the winding via the cooling passage structure in response to alternating between the first mode and the second mode.

14. The method according to claim 13, further comprising controlling the pump arrangement in the first mode during at least five minutes prior to controlling the pump arrangement in the second mode.

15. The method according to claim 13, wherein the static electric induction system further comprises an insulation material arranged to electrically insulate the electric component, and wherein the method further comprises:

estimating a condition or an expected remaining lifetime of the insulation material; and switching the control of the pump arrangement between the first mode and the second mode based on the estimation.

16. The method according to claim 15 wherein estimating the condition or the expected remaining lifetime of the insulation material comprises estimating the condition or the expected remaining lifetime of the insulation material based on one or more of data from a monitoring system and data from a digital twin of the static electric induction system.

17. The method according to claim 13, further comprising controlling the pump arrangement in the first mode to pump the cooling fluid such that the dielectric cooling fluid is driven through the cooling passage structure in the forward direction to cool the electric component comprises controlling the pump arrangement in the first mode to pump the cooling fluid from the bottom part, through the cooling passage structure, and to the top part.

18. The method according to claim 13, further comprising controlling the pump arrangement in the second mode to pump the cooling fluid such that the dielectric cooling fluid is driven through the cooling passage structure in a reverse direction to cool the electric component comprises controlling the pump arrangement in the second mode to pump the cooling fluid from the top part, through the cooling passage structure, and to the bottom part.

19. The method according to claim 13 wherein the static electric induction system further comprises a suction chamber arranged above the electric component, wherein the method further comprises sucking the dielectric cooling fluid from the cooling passage structure into the suction chamber when the pump arrangement is controlled in the first mode; and discharging the dielectric cooling fluid from the suction chamber into the cooling passage structure when the pump arrangement is controlled in the second mode.

* * * * *